United States Patent [19]
Kornhauser

[11] 3,810,668
[45] May 14, 1974

[54] ENERGY ABSORBING BUMPER SYSTEM

[75] Inventor: Murray Kornhauser, Wynnewood, Pa.

[73] Assignee: Safety Consultants, Berwyn, Pa.

[22] Filed: Mar. 19, 1971

[21] Appl. No.: 126,155

[52] U.S. Cl. .................. 293/71 P, 267/116, 293/63
[51] Int. Cl. ............................................ B60r 19/10
[58] Field of Search ............ 188/262; 267/116, 139; 293/1, DIG. 2, DIG. 3, 60, 63, 71 R, 71 P, 98

[56] References Cited
UNITED STATES PATENTS

| | | | |
|---|---|---|---|
| 1,195,857 | 8/1916 | Royston | 114/214 |
| 1,543,098 | 6/1925 | Carter et al. | 188/282 |
| 1,799,894 | 4/1931 | Fritsch | 293/84 |
| 2,028,060 | 1/1936 | Gilbert | 47/23 |
| 3,588,159 | 6/1971 | Duckett et al. | 293/1 |

FOREIGN PATENTS OR APPLICATIONS

| | | | |
|---|---|---|---|
| 1,202,475 | 7/1959 | France | 188/282 |
| 449,396 | 6/1936 | Great Britain | 293/71 P |
| 1,082,402 | 12/1954 | France | 293/71 P |

*Primary Examiner*—Robert G. Sheridan
*Assistant Examiner*—Robert Saifer
*Attorney, Agent, or Firm*—Morton C. Jacobs

[57] ABSTRACT

An energy absorbing bumper system for protection of moving vehicles. The system comprising a storage tank and an impact bag, each containing compressed air, and means for controlling the flow of air between the bag and the tank. The bag is contoured for a generally flat impact surface to provide efficient operation and compact size, and to yield an aesthetically pleasing shape, and is held in shape by dividing the bag into a large number of compartments lying adjacent to each other along the direction of the surface to be protected, and by introducing compressed air into each compartment. Each one of the compartments of the bag is connected to the tank by means of an orifice.

12 Claims, 15 Drawing Figures

INVENTOR.
MURRAY KORNHAUSER
ATTORNEY

PATENTED MAY 14 1974 3,810,668

INVENTOR.
MURRAY
KORNHAUSER

ATTORNEY

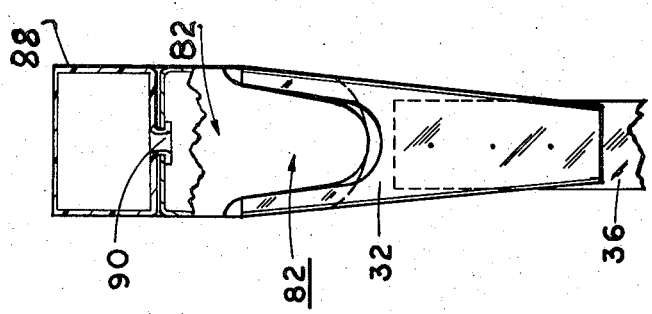
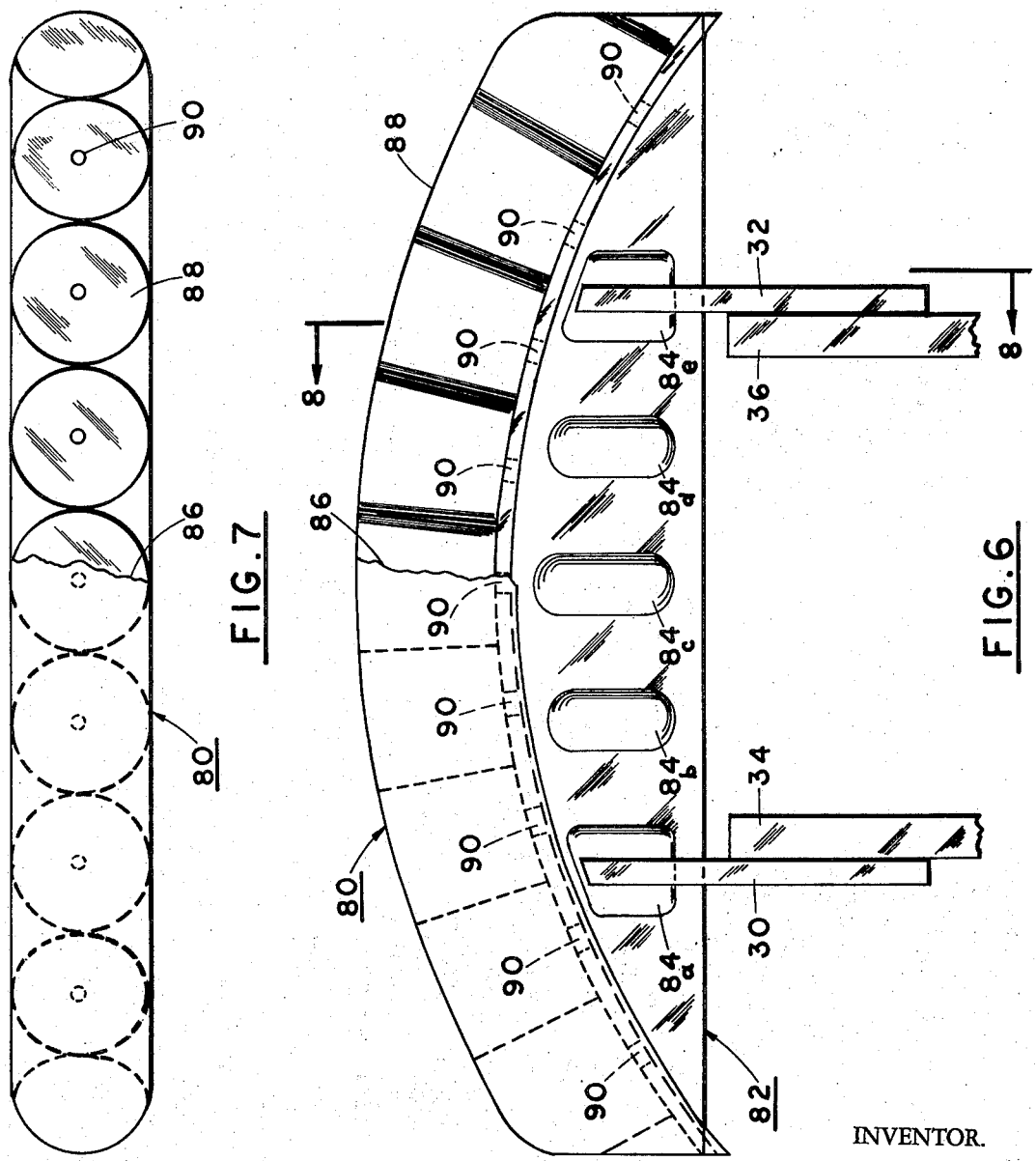

3,810,668

ENERGY ABSORBING BUMPER SYSTEM

BACKGROUND OF THE INVENTION

This invention relates to an energy-absorbing bumper system for protection of vehicles and passengers.

A large proportion of motor vehicle accidents occur at low speeds, e.g., less than 10 miles per hour (mph). These low speed accidents cause a major proportion of the total property damage which results from all motor vehicle accidents. Consequently, various Federal and State agencies are becoming active in efforts to minimize this damage. The National Highway Traffic Safety Administration is currently promulgating rules which may require protection of automobile safety related components such as lights, hoods, trunk and door latches, fuel, cooling and exhaust systems, during low speed collisions. Other governmental proposals indicate that motor vehicles may be required to be equipped with bumpers that prevent damage during collisions at speeds of less than 5 to 10 mph. In addition to minimizing property damage, improved bumper systems can also minimize injuries to pedestrians and to passengers of vehicles involved in collisions. Accordingly, a considerable effort has been undertaken by both governmental bodies and the automobile industry to minimize damage to both property and persons, caused by low speed collisions, since they represent a large percentage of the accidents and of the associated economic losses.

The National Highway Traffic Safety Administration is also promulgating safety rules in regard to deployment of safety devices (such as air bags, nets, padded blankets, or other soft media) for cushioning the passengers inside the car, in the event of potentially dangerous crashes at impact velocities of 10–30 mph or greater. In the development of this invention, it was recognized that the bumper system could be used to sense the impact velocity of the vehicle and to trigger or otherwise operate such safety devices.

Prior art bumper systems which have attempted to improve upon the performance of the conventional automobile bumpers have not come into popular use because of disadvantageous characteristics they have exhibited. Some prior art bumpers have operated on energy storing rather than energy absorbing principles. The former systems store the energy of impact and then, immediately after impact, return it to the motor vehicle. Because of the immediate return of energy, those systems behave like springs and thereby produce a potentially dangerous rebound. A vehicle having such a system may strike a vehicle ahead of it and then rebound and strike another closely following vehicle or be propelled at an angle into the path of opposing traffic, thereby resulting in an even more serious accident. Some prior art systems have sought to minimize rebound by providing an energy-absorbing rather than an energy-storing device. However, where those systems have not provided immediate resetting of the energy absorbing device, the vehicle cannot be protected against repeated shocks as in a chain collision. Other prior art systems, such as pneumatic bumpers, have suffered from lack of effectiveness as well as from both cost and cosmetic disadvantages. They have not been sufficiently adaptable to the great variety of sizes and styles of motor vehicles, nor have they provided the ease of style variation that is prominent in the manufacture of automobiles.

SUMMARY OF THE INVENTION

Accordingly, it is an object of this invention to provide an improved bumper system.

Another object is to provide a bumper system which tends to reduce damage to property and to people during low-speed collisions.

Another object is to provide a bumper system of sufficient design flexibility to be adaptable to provide bumpers which afford protection during high-speed collisions.

Another object is to provide a bumper system which reduces harmful rebound.

Another object is to provide a bumper system which is quickly and automatically reset to its impact-ready condition after a collision.

Another object is to provide a bumper system which is practical and economically suitable to fabricate and install on motor vehicles.

Another object is to provide a bumper system which is compact and light in weight.

Another object is to provide a bumper system which can be made ornamental.

Another object is to provide a bumper system of sufficient design flexibility to be adaptable to a great variety of vehicle sizes and shapes.

Another object is to provide a new and improved fluid-filled bumper system, such as a pneumatic bumper.

Another object is to provide a pneumatic impact velocity sensor.

Another object is to provide means for sensing pneumatic pressure increases and the rate of pressure increase in the bumper system, for purposes of triggering, actuating, or inflating safety devices in the passenger compartment of the vehicle.

In accordance with some forms of this invention, a bumper system is provided which includes a fluid container that is formed in two sections, one a storage tank section and the other a flexible section having an impact wall. The two sections are interconnected for controlled fluid passage from the impact section to the storage section upon impact, and back to the impact section after impact. In different forms of the invention, compressible and incompressible fluids are used. The impact section is generally enclosed, in one form, by the flexible impact wall and the adjacent wall of the tank; in another form, the impact section is a substantially fully enclosed flexible bag. The storage section, in different forms, is a rigid tank and a flexible-walled container. The impact section, in certain embodiments, is formed in compartments, which contributes to improved operation and maintenance, and each compartment may in turn be formed into subcompartments. Thereby, a considerable amount of flexibility is afforded in ornamental design of bumper shapes. In addition, with this and other constructions, a substantially flat impact surface is achieved and a substantially rectangular impact-versus-deflection characteristic. The pneumatic bumper system of this invention makes it possible to reliably sense impact velocity for controlling the operation of auxiliary safety equipment and to furnish a source of pressurized air for emergency use in such equipment.

BRIEF DESCRIPTION OF THE DRAWING

The foregoing and other objects of this invention, the various features thereof, as well as the invention itself, may be more readily understood from the following description when read together with the accompanying drawing, in which:

FIG. 6 is a plan view of an alternative embodiment of the invention;

FIG. 7 is a front view of the embodiment shown in FIG. 6;

FIG. 8 is a sectional view of the bumper of FIG. 6;

In the drawing, corresponding parts are referenced throughout by similar numerals.

DESCRIPTION OF A PREFERRED EMBODIMENT

Figure 2:
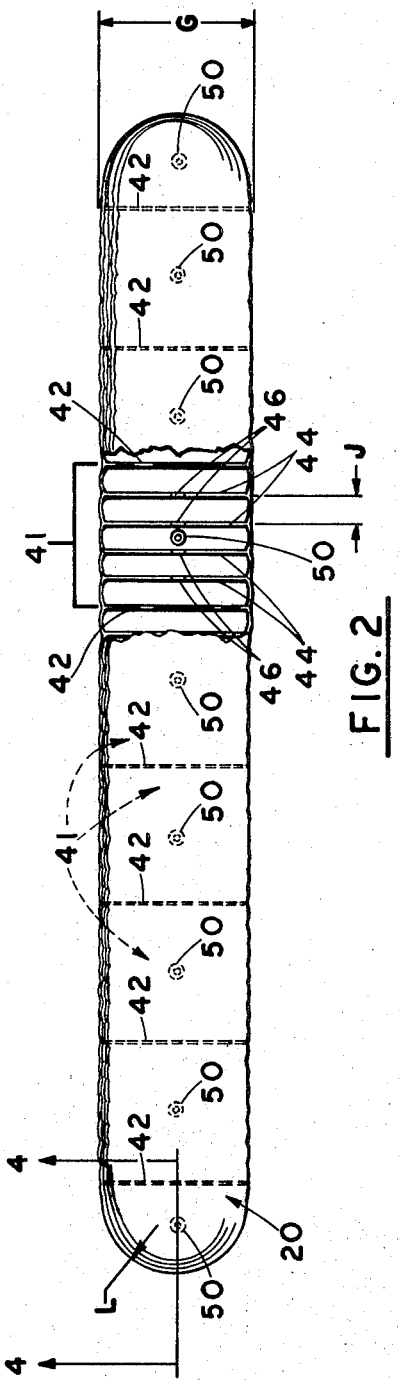
FIG. 2 is a front view of the bumper of FIG. 1.

In the bumper system shown in FIGS. 1–4, the bumper 15 comprises a flexible hollow impact cushion or bag 20 which contains pressurized air. Impact bag 20 may be fabricated of rubberized fabric, plastic coated fabric, molded plastic, or a lightweight wire mesh impregnated with plastic or rubber. The latter fabrication will provide special protection against abrasion and cutting. Impact bag 20 is mounted on an approximately cylindrically shaped air-tight tank 22. Tank 22 is constructed of a thin gauge metal, such as a thin sheet metal (e.g., 19 gauge) used for ordinary automobile bodies and fenders, so that it can be fabricated at low cost. This tank has a generally cylindrical shape and has attached thereto a front-surface support bracket 24 shaped to follow the contour of bag 20 and to provide maximum support thereto. Dome-shaped end caps 26 and 28 are welded into the tank to provide an airtight container. The tank has a volume approximately equal to and preferably greater than that of the bag.

Figure 3:
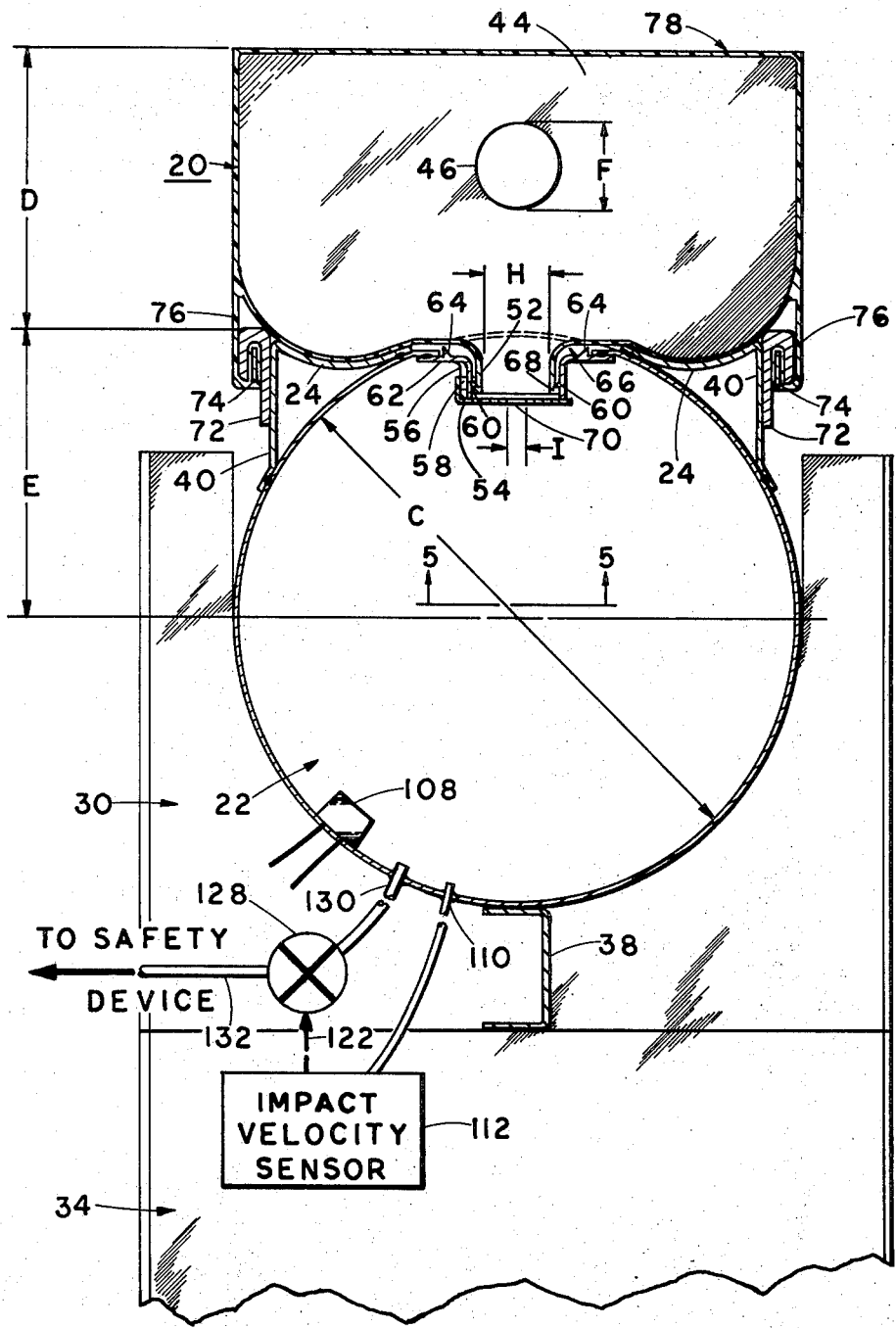
FIG. 3 is a sectional view of the bumper of FIG. 1.

Support brackets 30 and 32 in a yoke shape are fastened to and embrace the back and sides of the tank so as to mount and fasten the bumper to vehicle main frame members 34 and 36, respectively, by means of a load tie 38, which is a channel shaped metallic member that extends along most of the back side of the tank and laterally between the frame members to which it is attached. Bracket 24 has a generally flat forward surface with dishing cross-sectional curvature (as indicated in FIG. 3) and with spaced apertures therein as noted hereinafter. In addition, bracket 24 has bent-back flanges 40, and the latter are fastened (e.g., welded) to the tank, as is the forward surface at its tangent tines. The bracket flanges 40 have free ends at each end of the tank, and are used for securing impact bag 20 to the tank.

The length of impact bag 20 is divided into several (e.g., nine) separate compartments 41 by transverse webs 42 that extend internally across the inside of the bag and are bonded thereto around the entire inner periphery thereof. Each separate compartment is further divided into subcompartments 43 by several contour support webs 44. For clarity, contour support webs are shown only in the cutaway portion of one compartment 41 of FIGS. 1 and 2. However, each such compartment formed by the webs 42 is subdivided by contour support webs similar to those shown. The purpose of the contour support webs is to give structural support to the exterior surface (and particularly the front face) of the impact bag so as to shape it in the desired contour. By means of these contour webs, the impact bag is shaped for optimum operational characteristics and sizing, as well as for ornamental appearance. Each contour web 44 has a hole 46 therethrough, to allow relatively free passage of air between subcompartments, whereby each compartment functions as a unit pneumatically. The structure heretofore described is shown more clearly in FIG. 3, which is an enlarged view of Section 3—3 of FIG. 1, and in FIG. 4, which is an enlarged view of Section 4—4 of FIG. 2.

Figure 4:
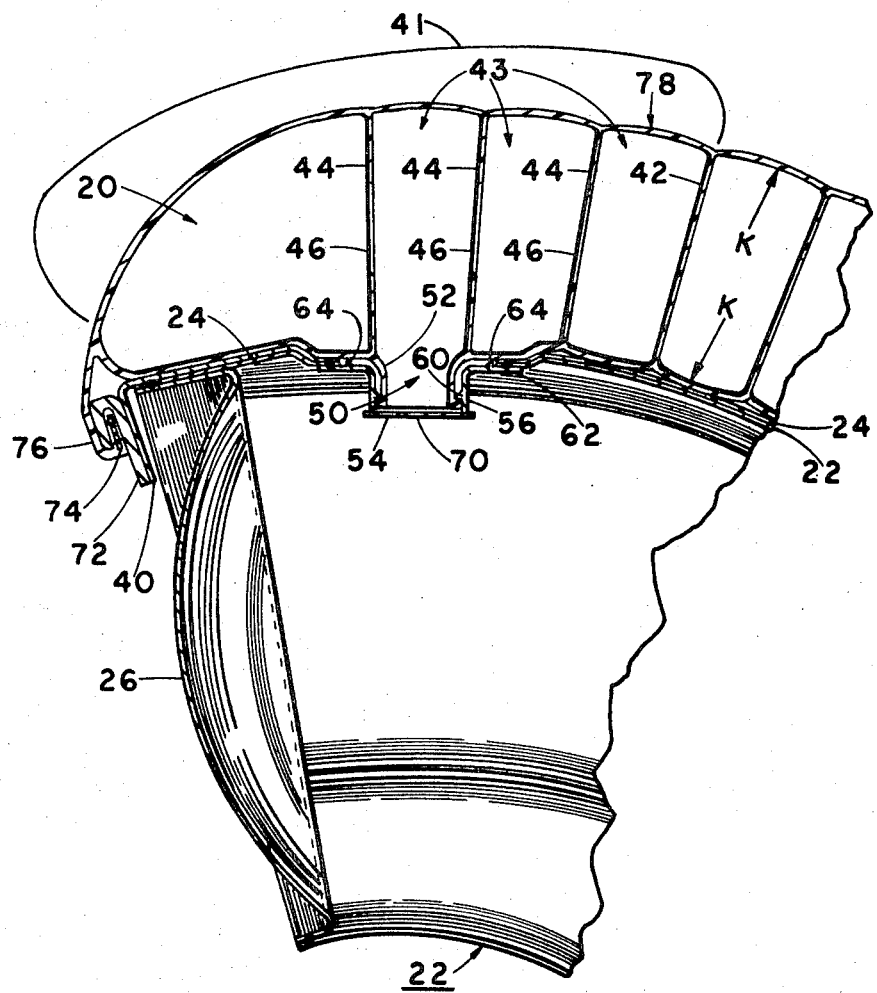
FIG. 4 is a sectional view of the bumper shown in FIG. 2.
Figure 5:
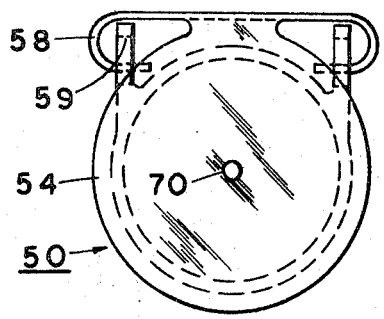
FIG. 5 is a plan view of the flapper check valve as seen along line 5—5 of FIG. 3.

Each compartment 41 of impact bag 20 is connected to tank 22 by a port 52 fitted with a check and orifice bleed valve 50 (FIGS. 2-5). Any check valve which is normally closed by gravity and/or a spring or the equivalent may be used. The detailed structure of a preferred form of valve is shown in FIGS. 3-5. The valve 50 may be formed of metal or a rigid plastic which surrounds and retains inside the tank the flexible neck of port 52. The exit of the valve (or alternatively the neck of the port) is covered by a hinged, stiff flapper member 54 which normally closes the valve under gravity, but can be opened under internal pressure created upon impact in bag 20. Flapper 54 is pivotally connected to the neck portion 56 of the valve 50 by a hinge hook 58 that pivots in an elongated slot 59 in the neck 56 for opening and closing; the slot makes it possible for the flapper to pivot and to seat readily without a precision fabrication.

A sharp internal ridge 60 is formed around the neck portion 56 of the valve, and a second sharp internal ridge 64 is formed about the attachment flange 62 of the valve (which flange is fastened and sealed to the inside rim of a valve hole in tank 24). The space 66 between the ridges 62 and 64 and between the port 52 and valve 50 is vented by small passages (not shown) to ambient pressure, so that internal pressure in the flexible bag in the region of space 66 seals the bag surface to the valve. A bead 68 at the mouth of the port 52 is retained in position by the sharp ridge 60 and serves to position the port 52 during assembly. Flapper 54 has a small bleeder orifice 70 to allow equalization of air pressure in bag 20 and tank 22 when valve 50 is closed.

Impact bag 20 can be installed on tank 22 without use of fasteners, thereby enabling advantageous reduction in assembly and maintenance time as well as original fabrication costs. The structure for accomplishing this is shown in FIGS. 3 and 4. A hook-shaped retainer 72 extends around the tank and is fastened to adapter bracket 40 (the retainer 72 may also be formed in separate sections bolted to or otherwise secured to the bracket 40). Impact bag 20 has a flat edge portion 76 (or separate portions spaced around the bag) which has a rigid strip 74 secured in the outer end thereof, which stiffened end is inserted in the hook of retainer 72. The hook-shaped retainer 72 and flap 76 extend completely around the outer surface of the impact bag. Thus, the stiffened end of the flap 76 is held tightly in the retainer when the impact bag is inflated, without requiring fasteners such as bolts. The flap 76 may be inserted in the retainer 72 and the latter then bolted onto the bracket 40. Alternatively, the flaps 76 can be secured to the retainers 72 (without removing the latter) in a manner similar to that used in mounting a tire bead over a wheel rim. Wtih the bag deflated, there is sufficient slack to permit connection of the flaps 76 in the retainer 72, which flaps are fully tightened when the bag is inflated. Impact bag 20 is inflated by means of a valve 79 which is mounted on the tank (or on the bag itself).

Theory of Operation of the Invention. The bumper system of the invention operates under normal conditions with the same pressure in the flexible impact bag 20 and rigid tank 22, since the bag and tank communicate via the series of ports 52 and valve 50. When the bumper strikes a rigid barrier, the kinetic energy of the vehicle is converted to potential energy by compressing the air The the bag. Jhe kinetic energy is:

$$K E = \tfrac{1}{2} m v^2 \quad (1)$$

where $m$ is the vehicle mass and $v$ is the vehicle velocity. The potential energy is:

$$PE = \int_0^s p A\, ds \quad (2)$$

where $A$ is the bag area touching the barrier, $p$ is the instantaneous pressure and $s$ is the stroke (i.e., decrease in depth of the bumper). Thus, the bumper characteristics, area, pressure and stroke, needed to afford protection for a vehicle of given mass, can be determined by equating equations 1 and 2; the integration from $o$ to $s$ in equation 2 is employed because both area and pressure vary with the stroke. At the end of the stroke, vehicle velocity $v$ is zero and the bag volume is reduced to a small fraction of the original volume. The air pressure in the bumper is increased because of this volume decrease, and is approximately the same in the bag and in the tank, since the associated valve 50 is open for essentially free passage of air. After the impact, the vehicle velocity is zero and all of the absorbed kinetic energy is converted to potential energy in the form of increased air pressure. Since the major portion of the air mass under pressure is pushed from the bag into the tank, most of the potential energy is stored in the tank.

After impact, the interconnecting ports between bag and tank are closed by the valve closures 54 when the bag pressure starts to fall. Thus the portion of the potential energy stored in the tank cannot return rapidly to the impact bag and therefore cannot contribute to rebound, and the energy remaining in the bag due to less than complete exhaustion will tend to be minor and often negligible. After impact with an obstacle, when the bag is no longer compressed by the obstacle, the volume of the bag increases under its high internal pressure until the pressure inside the bag becomes equal to the ambient pressure. At this point, the bag is limp and the air pressure in the tank is higher than the air pressure in the bag, under which condition the valve closures 54 are held closed. Since the valve closures contain small bleeder holes 70, the higher-pressure air in the tank bleeds back into the bag and restores the original bag contours and pressure. The bleeder hole size, and thereby the rate of recovery, is designed to avoid harmful contribution to rebound. When the air bleeds back into the bag, the potential energy in the tank is reconverted to kinetic energy and the kinetic energy is dissipated in turbulent motion and heat in the bag. The time for this recovery is much greater than the small fraction of a second during which there is danger of rebound, and of the order of a second, so that the system recovers rapidly to be operational for another impact as may occur in multi-car collisions.

In normal operation, internal air pressures are applied to the walls of the impact bag and the tank, with the effective tensions of the bag and tank being in opposite directions at the bag-to-tank joint. The bag and tank forces are all in balance with no net force applied to the bracket members 30, 32, 38 and to the vehicle frame members 34, 36. Upon impact, the bag crumples and the tank pressures, which are no longer balanced by the opposing bag pressures, act on the brackets 30, 32, 38 in a direction to decelerate the vehicle. Effectively, the force generated by the obstacle impact with the vehicle is the impacted area of the bag times the internal air pressure, and this force is transferred by a column of compressed air to the rear wall of the tank and thence to the support brackets and vehicle.

The energy that can be absorbed by the bumper system of the invention is directly dependent on the air pressure within the impact bag, the surface area over which the impact is to be absorbed, and the stroke or depth of the bumper. Since, for size and cosmetic reasons, it is desirable to minimize the depth of the bumper, it is especially desirable to maximize the frontal area of the impact bag upon which the impact is to be absorbed. To accomplish this, the impact bag cross-section is made generally rectangular in cross-section with a substantially flat front face 78, as shown in FIG. 3. The flat front face receives the impact pressures over a larger contact area than if an impact bag of round cross-section were used. Consequently, larger decelerating forces can be achieved on first contact, and a shorter stroke or bag deflection can absorb the impact energy. Thereby, the bumper can be designed to protrude less from the front and rear ends of the vehicle than if a round-shaped impact face were employed. In addition, the flat face bumper functions with a more nearly uniform load-stroke or deceleration level.

The flat forward or impact surface 78 of the impact bag is maintained by full vertical webs 42 and contour support webs 44. The smaller the spacing J (FIG. 2) between adjacent webs (i.e., the narrower the subcompartment) with respect to bumper height G, the flatter (the larger the radius of curvature of) the front surface of the bumper. A nearly flat surface is achieved when the web spacing is small with respect to (e.g., about 25 percent or less) the bumper height. However, there are no upper or lower limits of web spacing that may be useful. The exterior surface can be made entirely flat (or any other desired ornamental shape) by adding extra non-functional material (e.g., in the depressions at each contour web shown in FIG. 4) to provide the desired surface while maintaining the interior surface in the shape necessary to carry the structural loads.

The total energy which can be absorbed by the bumper is also directly dependent on the number of compartments in impact bag 20 formed by full vertical webs 42. For a given bumper design and level of impact, the greater the number of compartments provided, the greater is the energy that can be dissipated. That is, the energy corresponding to the exhaustion (partial or complete) of one or more compartments is momentarily stored in the tank during the prime decelerating stroke (e.g., about 0.1 second on collision of a full size automobile at 5 mph). This energy is essentially not restored during the next comparable time period during which there is danger of rebound, but is slowly returned through orifice 70 over a longer time (e.g. about 1 second). Thus, the energy of exhausted compartments is in the storage tank (there is but negligible return of energy to other compartments via their orifices 70) and does not contribute to rebound.

In addition, the division of impact bag 20 into separate compartments prevents catastrophic failure in case one compartment is punctured in an accident. In that event, air is largely prevented from escaping from the tank through the punctured compartment via valve 50. The only escape of air would be through the bleeder hole 70 of the valve for the punctured compartment. However, that escape would be negligible during the time of the impact stroke, so that the other compartments would function and be capable of absorbing much of the energy of impact. Moreover, the division of the impact bag into compartments also aids in forming the flat impact face of the bag and can permit design variations to accommodate the ornamental requirements of automobiles as well as serve to augment such ornamentation concomitant with meeting safety needs.

Illustrative dimensions and other parameters of the embodiment of the invention of FIGS. 1–4 are shown in Table I, to indicate the relationship of parts described herein and without in any way limiting this invention in its scope. These dimensions and parameters provide a bumper system capable of absorbing sufficient energy (e.g., thousands of foot pounds) to reduce substantially the damage to a 4,000 pound vehicle during a 5 mph collision. Other dimensions and parameters can be used to provide different protection.

TABLE I

| Dimension | Size (inches) |
|---|---|
| A (length) | 80 |
| B (flat half length) | 24 |
| C (flat diameter) | 10 |
| D (depth of bag) | 2–4 |
| E (center of tank to retainer) | 5 |
| F (hole in contour web) | 1 ½ |
| G (height) | 10 |
| H (port diameter) | 1 ¼ |
| I (orifice size) | 0.1 to 0.25 |
| J (web spacing) | 2 |
| Radii of Curvature | |
| K (impact bag face) | 5 (typical) |
| L (end height of bag) | 5 |
| M (end depth of bag) | 5 |
| N (end of curve of bumper) | 20 |
| Air pressure | 20 to 40 pounds per square inch |

Basic considerations in the configuration of this pneumatic bumper system are weight and bumper projection in front and back of the automobile, both of which are to be minimized. This configuration tends to minimize weight by providing the tank as a load-transmitting member, and a pressurized cylinder is an extremely efficient structural element. By virtue of transmitting loads to the tank via the compressed air within the soft bag, and thereby avoiding load concentrations (e.g., sharp points or discontinuities), it is possible to use a minimum gauge sheet metal for the storage tank, thus saving weight. The tank is placed directly in front of the car's frame, and the forces are transmitted to the vehicle frame or chassis members 34 and 36 through load-spreading or distributing attachments in the form of the yokes 30 and 32, thus introducing no stress concentrations which would prevent thin-gauge tank construction.

Figure 12:
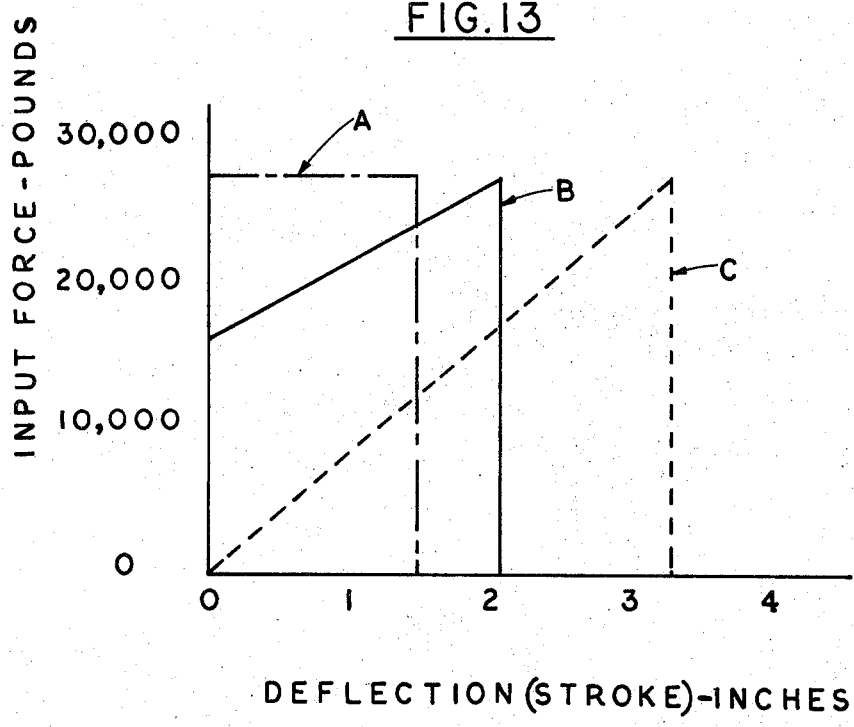
FIG. 12 is an idealized diagram of a load-stroke characteristic used to explain features of this invention.

Minimum bumper projection is obtained in two ways. First, the storage tank 22 is located inside the exterior contour at the front and rear of the vehicle; that is, within the front facade or grille, and within the sheet metal trim under the trunk of the conventional automobile. Second, the bag projection may be maintained at about 2 inches for the 5 mph design, by approaching the condition of constant load-stroke performance. FIG. 12 illustrates the significance of load-stroke curve shape. Note that the area under a load-stroke curve is proportional to the energy absorbed, and in FIG. 12 the area under each curve is about the same, i.e., over 3,000 foot pounds for the example assumed. The impact force corresponds to the pressure in the bag times the area of the bag subjected to impact. FIG. 12 shows three equal-arc, equal-peak force deflection curves. Curve A is the idealized rectangular load-stroke curve and represents the condition of a constant impact force of about 24,000 pounds, corresponding to a uniform deceleration of 6 G for a 4,000 pound automobile; an idealized bumper of the curve A characteristic has the minimum deflection of about 1⅝ inches. Curve B is the calculated performance of the pneumatic bumper of FIG. 1, with a deflection of 2 inches. In this example, the initial bag and tank pressure of 30 psi is effective over a bumper impact area of about 500 square inches (the flat length of about 50 inches) and the pressure increases to approximately 38 psi at the end of the impact. Curve C is typical of a spring-supported rigid bumper or other bumper system with a gradual load build-up, and it has a deflection of 3¼ inches. In this example, it is shown that the pneumatic bumper design of FIG. 1 has performance characteristics that approach the ideal of curve A; for example, the load-stroke factor of the constant force Curve A is 1, and for Curve B it is 1.2 corresponding to the ratio of the peak force (24,000 pounds) and the average force (20,000 pounds). Physically, this good performance of within 20 percent of the ideal is achieved by employing a flat face to engage the obstacle being struck, and by using a large-volume tank which tends to maintain a constant system pressure during impact.

Other Embodiments of the Invention. The bumper system of the invention can be readily adapted to a variety of configurations other than the one shown in FIGS. 1–5. For example, the embodiment shown in FIG. 6 has a constant radius of curvature, to provide uniform protection over a range of angles of impact with respect to the vehicle center line. FIG. 7 shows the front view of the embodiment of FIG. 6, and FIG. 8 shows a sectional view at section 8—8 of FIG. 6. In this embodiment of the invention, impact bag 80 and tank 82 are shaped to provide a bumper of constant radius of curvature. Dimples 84a through 84e are formed in the walls of tank 82 for stiffening. Impact bag 80 comprises a flexible outer casing 86 (e.g., of a tough rubber or plastic coated wire-mesh material) over a plurality of discrete air-tight cylinders 88 (nine cylinders are shown). Use of discrete cylinders to form the separate compartments of the impact bag provides low cost bumper maintenance because one or more cylinders can be replaced without replacing the outer casing or the other cylinders. The outer casing can be secured to the tank in the manner described above. Each cylinder 88 is connected to tank 82 by a fixed, metering orifice 90 (or with a flapper check valve as described above). The orifice can be formed as a flexible port that fits tightly in a corresponding passage in tank 82. Use of a fixed orifice instead of the flapper check valve arrangement of FIG. 3 provides a simpler construction; however, it does not provide as much control of energy transfer and storage as does the check valve.

The bumper of FIGS. 1-4 may also be formed of individual compartments with internal contour webs. Each such compartment can be separately attached to and assembled on the tank in the same fashion as the bag 20. Where the radius of curvature varies as in FIG. 1, the individual compartments vary depending on their location along the bumper. With a constant radius of curvature, each compartment is the same except for specially shaped end compartments. An external casing, such as casing 86, may be used if desired.

Figure 9:
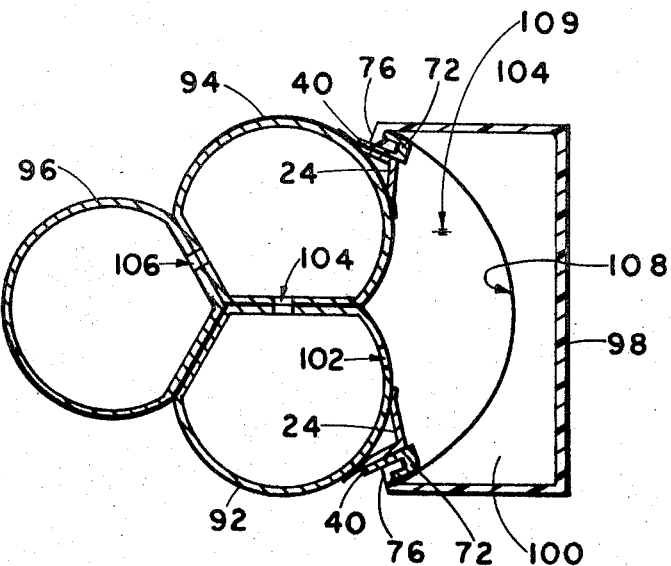
FIG. 9 is an alternative embodiment of the invention using multiple storage tanks.

FIG. 9 shows a sectional view of another embodiment of the invention which utilizes a plurality of storage tanks 92, 94, 96. Impact bag 98 is similar in structure to the impact bag of the embodiment of FIG. 1, having a rectangular cross-section and comprising a series of compartments similar to compartments 41, which are subdivided into subcompartments by contour control webs 100. Each compartment of the impact bag 98 is connected to storage tank 92 by its orifice 102. Storage tank 92 is connected to adjacent storage tank 94 by orifice 104, and storage tank 94 is connected to storage tank 96 by orifice 106; the diameters of the successive orifices may be made smaller in size. The storage tanks serve as a structural support and back-up for cushion bag 98 and transmit the impact forces to the vehicle frame to which they are connected in a fashion similar to that described above. In this embodiment, air is forced out of bag 98 during impact, into tank 92, and then sequentially into tanks 94 and 96. The flow of air is restricted by orifices 102, 104 and 106, and a substantial part of the energy is dissipated. In the embodiment of FIG. 9, the orifices have diameters of approximately one-half inch. Although three tanks are shown in FIG. 9, a greater number may be cascaded. The capability to dissipate energy increases with the number of tanks, but the bumper system also becomes more complex.

The tanks and orifices for this case are sized so that a maximum of energy is dissipated (minimum rebound). This is done by determining the orifice size which results in a mode of operation where minimum energy is recovered for a given impact energy, bumper design, velocity, tank size, and number of tanks. The number of tanks may be varied independently to arrive at an optimum solution for the specific requirements attendant to that application. Tank sizes may be varied between designs and within a specific design, or may be kept constant and equal for convenience. A simple tank size for any particular multi-tank design is that of each tank having the same volume as the impact bag. See NASA Technical Note, NASA TN D-9710, Langley Research Center, Aug. 1968.

A variation of the contour support webs is shown in FIG. 9. Instead of the holes in the webs, an inner opening 108 in the web is formed in a catenary shape, so that the webs 100 carry pressure loads from the front face to the attachments at the storage tank and balance the loads between the top and bottom surfaces. This configuration has obvious advantages in reduced fabrication complexity but causes greater loads to be introduced into the support structure. Each of these webs 100 (in a fashion similar to the webs 44) yields individually so that each subcompartment yields to the shape of the obstacle; other supports or bulkheads may be used to support the outer "skin" of the cushion and to take up its tension to form desired contours. For example, vertically extending tubular struts may be inserted into the cushion skin along the front (vertically extending) impact face 78 of the bag, inside or out of the pressure cavity of the bag. In this variation, the forward face of the cushion is formed with pockets (e.g., internally accessible) into which are inserted rigid struts of metal or plastic. The struts are made strong enough to carry the internal air pressure load over the span from the top surface to the bottom surface of the cushion. During impact, they carry a similar air pressure load and can be impacted at any point along their length by the obstacle without exceeding their capability. The struts may be molded into place during construction of the cushion, or designed to be inserted afterward and to be replaceable in case of damage in an accident that exceeds design criteria. Since the struts are preferably witin the skin material, a hard rigid surface is not exposed to impact pedestrians. The struts and local cushion can yield inwardly individually so that the cushion conforms to the shape of the obstacle and excessive pressures are not generated.

FIG. 9 also illustrates another form of the invention in that the cushion bag 98 is not formed as a complete tubular enclosure, but instead the back wall section is omitted. The front wall sections of tanks 92 and 94 serve as the back wall for the bag, and air sealing is achieved at the tight flap and retainer connections 76 and 72. Sealing between compartments of the bag is by means of full sized webs 109 similar to webs 46 described above except that special provision is made for connection of the back edge of each such web 109 to the front wall sections of the tanks 92 and 94. The connections may be a series of spaced U-channels on the tank wall sections into which slide, respectively, beaded edges of the compartment webs 109. Such an arrangement would afford an adequate air seal between compartments.

Figure 1:
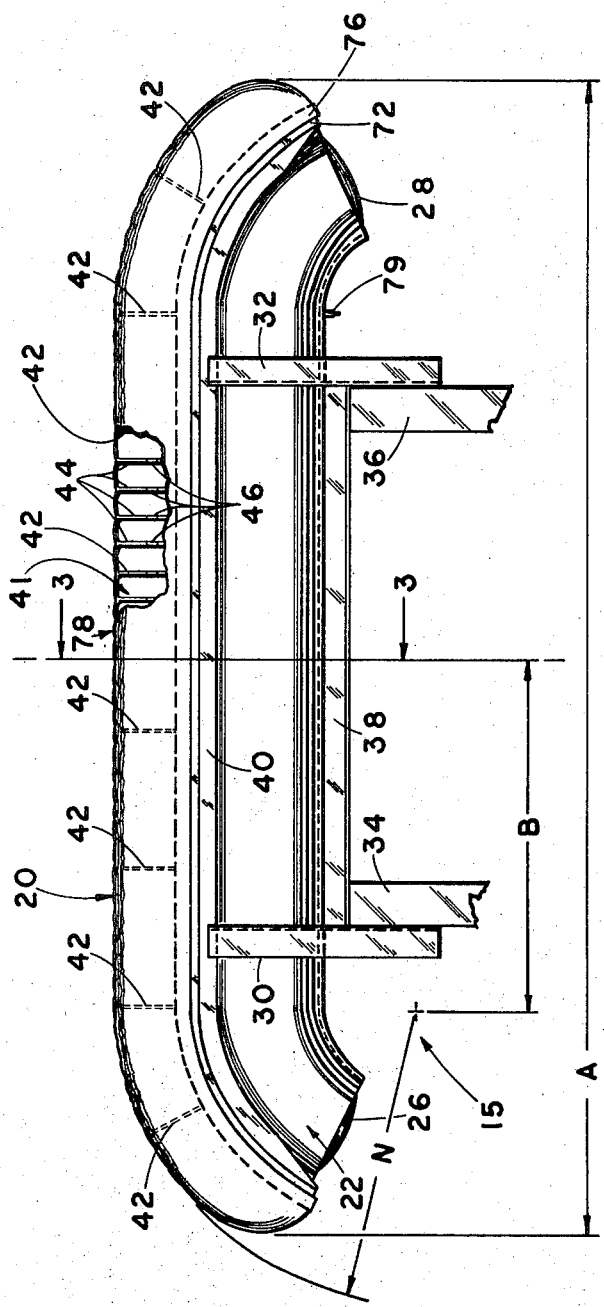
FIG. 1 is a plan view of the bumper system of the invention.

In the embodiments of the invention shown in FIGS. 1, 6, and 9, the storage tank is constructed of a thin gauge metal. This provides advantages in bumper weight and cost because the tank serves both as an air storage reservoir and as a support structure for attaching the impact bag to the vehicle frame. The tank also limits the peak impact pressures, minimizes rebound, and also restores pressure to the cushion. However, if required to satisfy specific conditions, a tank constructed of a flexible material such as that used for the impact bag may also be used. The application for a flexible tank may be caused by installations where adequate space for an efficient tank volume is not available directly behind the bumper location, or where the configuration is such that it is desirable to collapse (deflate) the tank for storage or other special functions of the vehicle. In this case, a tank location using the flexible tank can provide design solutions not available if a rigid tank must be used.

The tank size is designed primarily by proportion to the volume of the bag, so that the combined volume is such that the pressure rise during a maximum stroke impact does not exceed the overall peak design pressure for which the system is designed. The pressure rise is inversely dependent on the volume of the tank which must contain all of the air forced out of the bag as well as the air originally in the tank. Hence, a larger tank means a lower pressure rise, a more nearly uniform decelerator level (force), a shorter stroke and less protrusion of the bumper from the vehicle. If a tank of the desired volume cannot be adequately stowed within allowable space, an alternative version of the tank may be used which is especially suitable for use on buses, delivery trucks, and other compact vehicles. The tank is reduced in size to be essentially a manifold with connections via check valves to each cushion compartment. The cushion is supported primarily by other structure, as, for instance, bumpers of the type now in use on buses and trucks, and the tank may be placed above the cushion or in any nearby available location.

The tank is equipped with a relief valve which allows excess pressure to be vented to the atmosphere as air is forced into the tank from the cushion during impact. After impact, the relief valve closes and reseals itself when tank pressure approaches initial inflation pressure. The tank also serves in its manifold characteristic as the single refilling point for all the bag compartments. The volume of air required to restore the tank cushion volume to the desired initial pressure may be supplied by an on-board source such as a compressor or high pressure storage tank which can be operated automatically, or it may be supplied from the nearest service station.

Although the fluid used in the preferred embodiments of the invention is air, other compressible fluids may be used. Air is especially desirable where the cushion bag is vented directly to the ambient on impact; in this case the air-tank service available at a service station or carried in the vehicle (e.g., trucks and buses) can be used to restore the bag after impact.

Advantages of the air cushion bumper with respect to pedestrian safety are due to the low pressure that it will impose on impacting the pedestrian, such as in the legs, as compared with the stresses that would result from impact by a metal bumper or a metal bumper having a thin pad of resilient material. The stress imposed by the air cushion is limited to the inflation pressure, about 30 psi, which can be withstood by the body, while a steel bumper has an allowable bearing stress in the order of 50,000 psi, which would crush bone.

Additional safety advantages of the air cushion bumper can be realized from use of characteristics inherent to the system. The increase in air pressure in the storage tank due to impact can be used to implement the operation of other safety systems for passenger and vehicle safety. Safety devices such as internal bags for positioning passengers can be inflated by a control device (not shown) actuated by an electrical signal from a sensor (e.g., a strain gauge) 108 in the tank 22, in response to the air pressure increase in the tank. An automatic application of the vehicle brakes can also be implemented by a signal from such an air pressure sensor or from a diaphragm-actuated element in which the diaphragm is connected via a tube 110 to be responsive to the pressure in tank 22. Locking the brakes can be important if the vehicle driver is momentarily incapacitated in cases where a vehicle is struck from the rear and may roll forward to strike another vehicle. The locked brakes will also prevent much travel from residual rebound, or if a vehicle is on a grade sufficient to roll freely. this versatility in coordination with other safety systems is important in the bumper system which, by definition, is the first point of contact in case of a crash.

Figure 13:
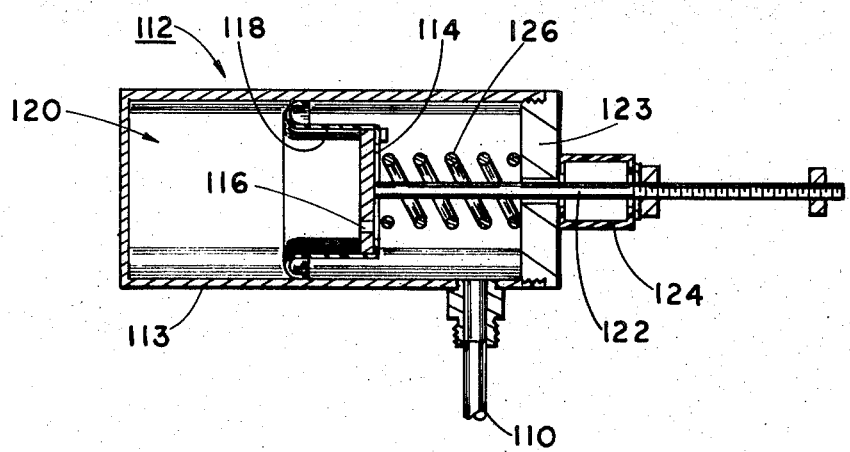
FIG. 13 is a schematic diagram of an impact velocity sensor which may be used with the safety system of FIG. 3.

Several theoretical approaches may be adopted for purposes of triggering the safety devices within the passenger compartment of the vehicle, with the basic requirement that velocity of impact must exceed 15-30 mph before actuation may be permitted. In this application, the requirement of sensing impact velocity may be fulfilled by making use of the rate-of-change of bumper pressure, which is proportional to impact velocity. In one arrangement, the rate of flow of fluid from bag to tank may be used, since it is proportional to impact velocity and proportional to the pressure difference across the orifice between bag and tank. This pressure difference may be sensed by a differential pressure gauge having its two input ports respectively connected to the bag and storage tank and used directly for activation purposes when the sensed pressure difference is at the required level. Another arrangement of an impact velocity sensor 112 is shown in FIG. 13, in which air pressure from the bag or tank 22 via tube 110 of sufficiently large diameter is delivered into a casing 113 to one side of a movable piston 114 which contains an orifice 116 and which is mounted on slack diaphragm 118 for movement in a closed chamber 120 on the other side of the piston. Connected to the latter is an actuating rod 122 which moves through a casing wall 123 that is sealed by a diaphragm 124 around the rod 122 and wall opening. A spring 126 balances the piston in a normal intermediate position and balances the air pressure on sealing diaphragm 124. The orifice size and the chamber volumes on opposite sides of the piston are selected so that impacts above a certain velocity (e.g., 15-30 mph) produce a pressure rise fast enough to cause motion of the piston 114 into chamber 120. Slower pressure rises do not cause piston motion because air flows through the orifice too quickly to permit enough pressure difference to develop across the piston. For example, a 30 mph impact on the illustrative example of the FIG. 1 bumper, having a bag of about 2 inches deep, results in a pressure rise from about 30 psi to 38 psi in several milliseconds. Under these conditions, the piston 114 is moved by the pressure developed across the orifice 116 and the concomitant rod movement can be effective for actuating a safety or control device as noted above. For example, the actuating rod 122 of the impact velocity sensor 112 can operate a valve 128 (FIG. 3) between a large diameter output port 130 of the tank 22 and a conduit 132 to a safety device. At the critical impact velocity, the valve 128 is opened to pass the compressed air from the tank 22 to a safety device such as an air bag to inflate it or otherwise operate it. Collisions of such velocity are likely to be so damaging that safety calls for use of the compressed air of the bumper system directly for protection of passengers where possible.

The air cushion bumper can be designed to withstand a 10 mph impact rather than a 5 mph by increasing the cushion depth (stroke) to accommodate 10 mph (e.g., a stroke of about 10 inches vs. 4 inches) at the acceptable deceleration level for the vehicle and occupants. The tank volume and air pressure can then be defined to achieve a balanced design. Impact surface area of the cushion as well as inflation pressure may also be increased for increasing the capability of the system. Similar changes can accommodate higher speeds, and if the vehicle is strengthened sufficiently to take higher deceleration loads, crashes at speeds of 20 to 30 mph can be tolerated with no damage to the vehicle. Systems of this nature must be coupled with internal restraints to the occupants to avoid serious injury under the high sustained deceleration. Still higher velocity, to 60 mph at least, can be accommodated if the bumper is increased in height, stroke and inflation pressure leading to more energy-absorption capability.

Figure 10A:
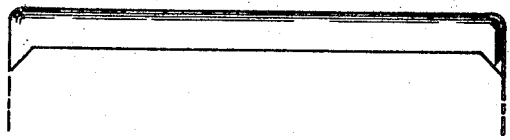
FIGS. 10A and B are plan-view sketches of ornamental designs of bumper shapes employing this invention.
Figure 10B:
Figure 11A:
FIGS. 11A and B are elevation-view sketches of ornamental designs of bumper shapes.
Figure 11B:

FIGS. 10A and B illustrate plan views and FIGS. 11A and B illustrate elevation views or profiles of various ornamental designs and configurations (composed of rounded and angulated shapes) that can be fabricated with the impact cushion of this invention employing the compartment and contour web structures described above. The storage tank can be readily fabricated to provide a shape along its length corresponding generally to that of the bag and shaping the bracket 24 to accommodate to unusually shaped areas. The compartments of the bag can be designed consistent with the overall impact requirements, and the compartment webs can be located at regions of discontinuity in cushion shape. The contour webs (or other bulkhead structures) can be used to define the profile shape of the functional portion of the cushion, and additional non-functional shapes can be added by filler material at modest cost as may be desired. In FIGS. 11A and B the protrusions can be achieved by appropriately shaping the contour webs or by filler material. Though various ornamental shapes can be achieved, the bumper impact surface is essentially planar since the protrusions in profile are negligible and various angulated sectional arrangements can be formed that are substantially planar.

Although the prime applications described for the bumper herein have been for over-the-road vehicles, other applications are readily apparent and still others will occur to those skilled in the art who are designing energy-absorbing apparatus. Other obvious applications include use on truck loading docks and platforms to prevent damage to the docks and trucks using them, on farm machinery not normally traveling over the road (trucks, wagons, tractors), and as fenders on boats and boat-docks, on construction machinery exposed to handling materials such as rocks, and requiring energy-absorption for the purpose, or for contact between two machines as a tractor being used to push a scraper, on fixed installations adjacent to highways including on guard rails, divider strips, traffic islands, signal installations, toll booth structures, and retaining walls, and in industrial plants requiring handling of heavy materials and energy-absorption of carts, dollies, pallets, conveyors, and handling vehicles.

While the foregoing has described what are at present considered to be the preferred embodiments of th invention, it will be apparent that various modifications and other embodiments within the scope of the invention will occur to those skilled in the art. Accordingly, it is desired that the scope of the invention be limited by the appended claims only.

What is claimed is:

1. A bumper apparatus for a vehicle comprising:
   a. a flexible bag structure having a flexible impact wall forming a cavity for containing a gas compressed under substantial pressure to absorb the energy of a collision of said vehicle applied over said impact wall,
   b. and means for attaching said bag structure to a vehicle with said impact wall in a generally upright orientation; said bag structure including means for forming the surface of said impact wall to have a substantially planar interior surface in opposition to said gas pressure, said impact surface forming means including load bearing means connected along said impact wall and between a plurality of spaced fixed parts of said bag attaching means, and having an uprightly oriented and substantially catenary shaped load distribution between said interior surface and said spaced fixed parts.

2. The apparatus of claim 1 wherein said impact surface forming means includes load bearing means connected between the upper and lower surfaces of said bag structure.

3. A bumper apparatus as recited in claim 1 wherein said load bearing means is flexible.

4. A bumper apparatus as recited in claim 3 wherein said load bearing means includes a web connected to the interior surface of said impact wall.

5. A bumper apparatus as recited in claim 4 wherein said web has an opening therein forming a substantially catenary shaped edge to the web.

6. A bumper apparatus as recited in claim 5 wherein the gas pressure is greater than 10 psi.

7. A bumper apparatus as recited in claim 1 wherein said flexible bag structure includes a plurality of flexible webs separating said bag structure along its length into a plurality of enclosed compartments, and said load bearing means includes a plurality of flexible intermediate webs having gas passageways therethrough to form sub-compartments within said compartments, said intermediate webs being connected to the inner surface of said bag structure.

8. The apparatus of claim 7 wherein said flexible bag structure includes means for limiting a substantial extension of said impact wall along the length of said wall, whereby impact against said impact wall for one of said flexible compartments is distributed to an adjacent one of said compartments.

9. The apparatus of claim 8 wherein said limiting means includes means for preventing movement of said impact wall along the length thereof.

10. A bumper structure as recited in claim 3 wherein the gas passageway of each of said intermediate webs forms a substantially catenary shaped edge to the web.

11. The apparatus of claim 10 wherein the spacing between adjacent ones of said flexible intermediate webs is small compared to the height of said bag structure.

12. A bumper structure as recited in claim 11 wherein the exterior surface of said impact is formed to an ornamental shape.

* * * * *

PO-1050
(5/69)

UNITED STATES PATENT OFFICE
CERTIFICATE OF CORRECTION

Patent No. 3,810,668            Dated May 14, 1974

Inventor(s) Murray Kornhauser

It is certified that error appears in the above-identified patent and that said Letters Patent are hereby corrected as shown below:

Col. 5, line 31, "jhe" should read --the--

Col. 8, line 56, "Bit" should read -- B it--

Col. 10, line 40, "witin" should read --within--

Col. 14, line 6, "th" should read --the--

Claim 12, line 2 (Col. 14) --wall-- should be inserted after "impact"

Signed and sealed this 1st day of October 1974.

(SEAL)
Attest:

McCOY M. GIBSON JR.
Attesting Officer

C. MARSHALL DANN
Commissioner of Patents